United States Patent
Twiss et al.

(10) Patent No.: US 7,995,473 B2
(45) Date of Patent: Aug. 9, 2011

(54) CONTENT DELIVERY SYSTEM FOR DIGITAL OBJECT

(75) Inventors: Adam Dominic Twiss, Cambridge (GB); David Sinclair Ferguson, Cambridge (GB)

(73) Assignee: Velocix Ltd., Cambridge (GB)

( * ) Notice: Subject to any disclaimer, the term of this patent is extended or adjusted under 35 U.S.C. 154(b) by 524 days.

(21) Appl. No.: 11/598,115

(22) Filed: Nov. 8, 2006

(65) Prior Publication Data

US 2008/0037438 A1 Feb. 14, 2008

(30) Foreign Application Priority Data

Aug. 11, 2006 (GB) .................................. 0615963.6

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *G06F 15/16* | (2006.01) |

(52) U.S. Cl. .................... 370/231; 370/252; 709/232

(58) Field of Classification Search .......... 370/231–235, 370/241, 252, 253; 709/227, 228, 232, 233
See application file for complete search history.

(56) References Cited

U.S. PATENT DOCUMENTS

| | | | |
|---|---|---|---|
| 5,511,208 A | 4/1996 | Boyles | |
| 5,892,914 A | 4/1999 | Pitts | |
| 6,003,030 A | 12/1999 | Kenner | |
| 6,011,804 A * | 1/2000 | Bertin et al. ................. | 370/468 |
| 6,098,096 A | 8/2000 | Tsirigotis et al. | |
| 6,108,703 A | 8/2000 | Leighton | |
| 6,167,438 A | 12/2000 | Yates | |
| 6,415,280 B1 | 7/2002 | Farber | |
| 6,745,243 B2 | 6/2004 | Squire | |
| 6,823,377 B1 | 11/2004 | Wu et al. | |
| 6,928,441 B2 | 8/2005 | Haegele | |
| 7,010,578 B1 | 3/2006 | Lewin | |

(Continued)

FOREIGN PATENT DOCUMENTS

EP 0 847 020 10/1998

(Continued)

OTHER PUBLICATIONS

Chandhok, Nikhil—Web Distribution Systems: Caching and Replication, Nov. 18, 1999, pp. 1-13, http://www.cse.wustl.edu/%7Ejain/cis788-99/ftp/web_caching/index.html.

(Continued)

*Primary Examiner* — Xavier Szewai Wong
(74) *Attorney, Agent, or Firm* — Ryan, Mason & Lewis, LLP

(57) ABSTRACT

A network and method for the delivery of digital data is disclosed having at least one peer (102*a*) downloading the digital data from a plurality of data sources (102, 312), at least one data monitoring device (800) for monitoring at least one quality of service parameter for the delivery of the digital data and at least one data delivery controller (810) for adjusting at least one of the rates for the delivery of the digital data from at least one of the plurality of data sources (102, 312).

14 Claims, 8 Drawing Sheets

U.S. PATENT DOCUMENTS

| | | | |
|---|---|---|---|
| 7,043,558 B2 | 5/2006 | Yoshida | |
| 7,062,568 B1 | 6/2006 | Senevirathne et al. | |
| 7,613,770 B2* | 11/2009 | Li | 709/203 |
| 2002/0129123 A1* | 9/2002 | Johnson et al. | 709/219 |
| 2003/0158958 A1 | 8/2003 | Chiu | |
| 2003/0204602 A1 | 10/2003 | Hudson | 709/228 |
| 2004/0148344 A1 | 7/2004 | Navar et al. | |
| 2004/0193714 A1 | 9/2004 | Bowman et al. | |
| 2005/0117586 A1* | 6/2005 | Ikeda et al. | 370/395.21 |
| 2006/0031537 A1* | 2/2006 | Boutboul et al. | 709/228 |
| 2006/0050642 A1* | 3/2006 | Chini et al. | 370/241 |
| 2006/0165014 A1 | 7/2006 | Ikeda | 370/254 |
| 2006/0212584 A1* | 9/2006 | Yu et al. | 709/227 |
| 2007/0127378 A1* | 6/2007 | Yang et al. | 370/235 |
| 2007/0130361 A1* | 6/2007 | Li | 709/231 |
| 2007/0220587 A1* | 9/2007 | Loyer | 726/1 |

FOREIGN PATENT DOCUMENTS

| | | |
|---|---|---|
| EP | 0 315 091 | 5/2003 |
| EP | 1 335 525 A2 | 8/2003 |
| EP | 1 335 525 A3 | 7/2005 |
| EP | 1 413 119 | 5/2006 |
| GB | 2 384 646 A | 7/2003 |
| GB | 2412279 A | 9/2005 |
| JP | 2006066973 | 3/2006 |
| WO | WO 99/05584 | 2/1999 |
| WO | WO 01/33542 A1 | 5/2001 |
| WO | WO 02/42900 A2 | 5/2002 |
| WO | WO 02/058360 A3 | 7/2002 |
| WO | WO 02/089000 A1 | 11/2002 |
| WO | WO 03/015377 A1 | 2/2003 |
| WO | WO 2005/084132 A2 | 9/2005 |

OTHER PUBLICATIONS

Konstanty, Piotr—Web Cache Charging Policies, Nicholas Copernicus University, NLANR Web Caching Workshop, Torun, Poland, Coulder, 1997, 3 pages http://workshop97.ircache.net/Papers/Kozinski/kozinski.html.

Malpani, Radhika—Making World Wide Web Caching Servers Cooperate, University of California at Berkeley, 10 pages, 1995 http://bmrc.berkeley.edu/research/publications/1995/138/paper-59.html.

Chu, H., "Relay Mode," Dec. 16, 2005, http://rakshasa.no/pipermail/libtorren t-devel/2005-December/000447.html>, pp. 1-2.

Vlavianos, A. et al., "BiToS: Enhancing BitTorrent for Supporting Streaming Applications," Department of Computer Science and Engineering, University of California Riverside, pp. 1-6, http://castor.sics.se/presentations/papers/bitos.pdf.

Legout, A. et al., "Understanding BitTorrent: An Experimental Perspective," INRIA-00000156, Version 3, Nov. 9, 2005, I.N.R.I.A., Sophia Antipolis, France, http://hal.inria.fr/inria-00000156/en, pp. 1-16.

Otto, C., "IO bound," Thursday, Apr. 12, 2007, http://lists.ibiblio.org/pipermail/bitterrent/2007-April/002075.html, p. 1.

International Search Report and the Written Opinion for International Application No. PCT/EP2007/007107, mailed on Nov. 26, 2007.

XP-002460863, Peer to Peer Cache Discovery Protocol (CDP) cachelogic-cdp-specification-02.txt, CacheLogic Ltd., Aug. 25, 2006.

* cited by examiner

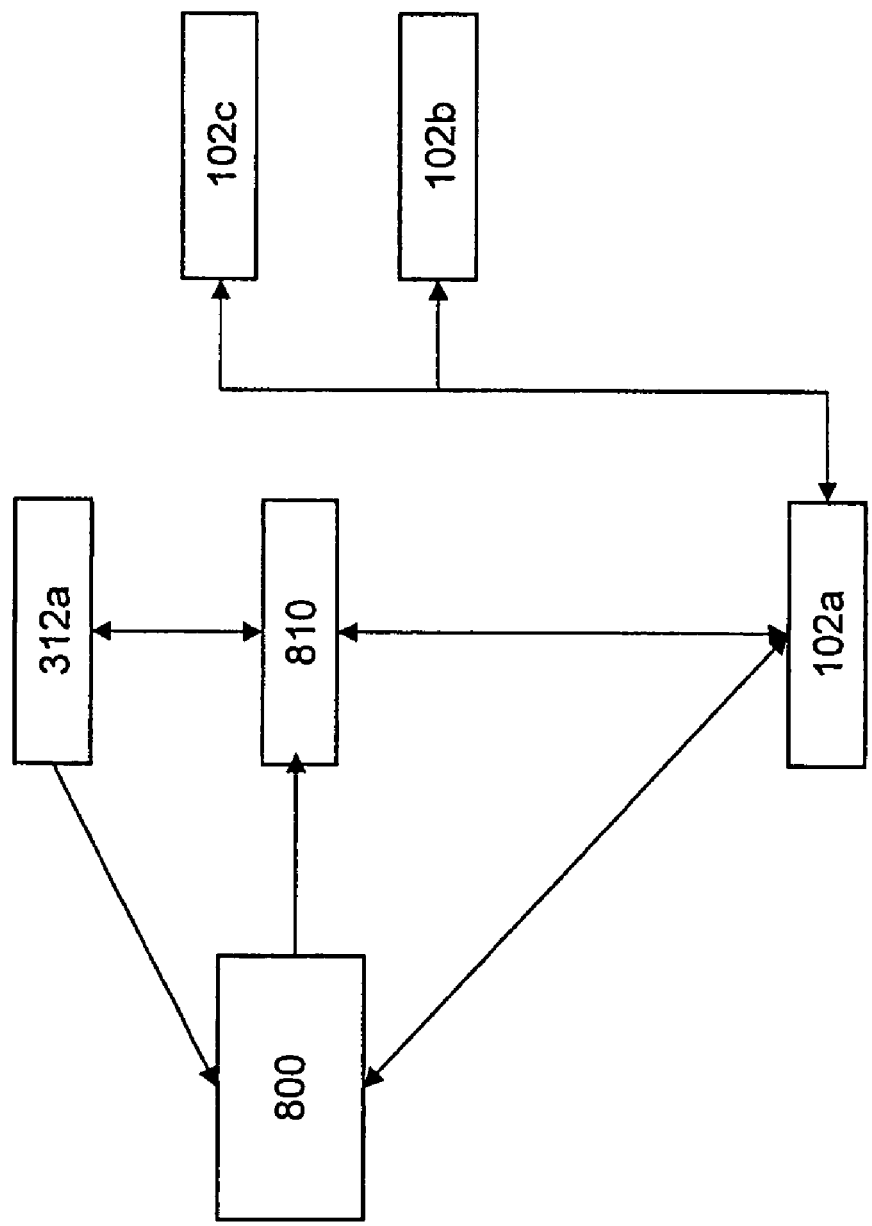

CONTENT DELIVERY SYSTEM FOR DIGITAL OBJECT

FIELD OF THE INVENTION

The present invention relates to a network and method for content delivery from multiple data sources, in particular in a peer-to-peer network.

BACKGROUND TO THE INVENTION

A peer-to-peer (also termed P2P) computer network is a network that relies primarily on the computing power and bandwidth of the participants in the computer network rather than concentrating computing power and bandwidth in a relatively low number of servers. P2P computer networks are typically used for connecting nodes of the computer network via largely ad hoc connections. The P2P computer network is useful for many purposes. Sharing content files containing, for example, audio, video and data is very common. Real time data, such as telephony traffic, is also passed using the P2P network.

A pure P2P network does not have the notion of clients or servers, but only equal peer nodes that simultaneously function as both "clients" and "servers" to the other nodes on the network. This model of network arrangement differs from the client-server model in which communication is usually to and from a central server. A typical example for a non P2P file transfer is an FTP server where the client and server programs are quite distinct. In the FTP server clients initiate the download/uploads and the servers react to and satisfy these requests from the clients.

Some networks and channels, such as Napster, OpenNAP, or IRC @find, use a client-server structure for some tasks (e.g., searching) and a P2P structure for other tasks. Networks such as Gnutella or Freenet use the P2P structure for all purposes, and are sometimes referred to as true P2P networks, although Gnutella is greatly facilitated by directory servers that inform peers of the network addresses of other peers.

One of the most popular file distribution programmes used in P2P networks is currently BitTorrent which was created by Bram Cohen. BitTorrent is designed to distribute large amounts of data widely without incurring the corresponding consumption in costly server and bandwidth resources. To share a file or group of files through BitTorrent, clients first create a "torrent file". This is a small file which contains meta-information about the files to be shared and about the host computer (the "tracker") that coordinates the file distribution. Torrent files contain an "announce" section, which specifies the URL of a tracker, and an "info" section which contains (suggested) names for the files, their lengths, the piece length used, and a SHA-1 hash code for each piece, which clients should use to verify the integrity of the data they receive.

The tracker is a server that keeps track of which seeds (i.e. a node with the complete file or group of files) and peers (i.e. nodes that do not yet have the complete file or group of files) are in a swarm (the expression for all of the seeds and peers involved in the distribution of a single file or group of files). Nodes report information to the tracker periodically and from time-to-time request and receive information about other nodes to which they can connect. The tracker is not directly involved in the data transfer and is not required to have a copy of the file. Nodes that have finished downloading the file may also choose to act as seeds, i.e. the node provides a complete copy of the file. After the torrent file is created, a link to the torrent file is placed on a website or elsewhere, and it is normally registered with the tracker. BitTorrent trackers maintain lists of the nodes currently participating in each torrent. The computer with the initial copy of the file is referred to as the initial seeder.

Using a web browser, users navigate to a site listing the torrent, download the torrent, and open the torrent in a BitTorrent client stored on their local machines. After opening the torrent, the BitTorrent client connects to the tracker, which provides the BitTorrent client with a list of clients currently downloading the file or files.

Initially, there may be no other peers in the swarm, in which case the client connects directly to the initial seeder and begins to request pieces. The BitTorrent protocol breaks down files into a number of much smaller pieces, typically a quarter of a megabyte (256 KB) in size. Larger file sizes typically have larger pieces. For example, a 4.37 GB file may have a piece size of 4 MB (4096 KB). The pieces are checked as they are received by the BitTorrent client using a hash algorithm to ensure that they are error free.

As further peers enter the swarm, all of the peers begin sharing pieces with one another, instead of downloading directly from the initial seeder. Clients incorporate mechanisms to optimize their download and upload rates. Peers may download pieces in a random order and may prefer to download the pieces that are rarest amongst it peers, to increase the opportunity to exchange data. Exchange of data is only possible if two peers have a different subset of the file. It is known, for example, in the BitTorrent protocol that a peer initially joining the swarm will send to other members of the swarm a BitField message which indicates an initial set of pieces of the digital object which the peer has available for download by other ones of the peers. On receipt of further ones of the pieces, the peer will send a Have message to the other peers to indicate that the further ones of the pieces are available for download.

The substantial increase in traffic over P2P networks in the past few years has increased the demand for P2P caches and also for alternative P2P management techniques. In particular there is a need to ensure that those pieces of the digital object required are preferably available with required access times. Furthermore there is a need to ensure that management techniques can ensure that bandwidth is used most effectively and cost-efficiently.

SUMMARY OF THE INVENTION

The invention provides a network for the delivery of digital data with at least one peer downloading the digital data from a plurality of data sources at least one data monitoring device and at least one data delivery controller. The data monitoring device monitors quality of service parameters for the delivery of the digital data and the data delivery controller adjusts the rates for the delivery of the digital data to manage the data delivery. This allows the optimal delivery of the digital data since the different sources of digital data can all be used to their best advantage.

The plurality of data sources comprise both caches and other peers. Each of these different data sources has their advantages as will be explained below.

The quality of service parameters include, but are not limited to, the cost of the data delivery and the rate of data delivery received by the peer. These are generally the quality of service parameters of most concern. Suppliers of digital data wish to deliver the digital data as quickly as required and as cheaply as possible.

The invention further provides a method for the delivery of digital data to a peer from a plurality of data sources comprising the following steps:

a first step of accessing multiple ones of the plurality of data sources;

a second step of downloading data from the multiple ones of the plurality of data sources;

a third step of monitoring a rate of receipt of the digital data at the peer from the plurality of data sources;

a fourth step of comparing the rate of receipt of the digital data with at least one quality of service parameter; and a fifth step of adjusting the rate of receipt of the digital data at the peer from at least one of the plurality of data sources in accordance with the comparison of the fourth step.

Finally the sources of data are used efficiently by providing a method for maximising the use of bandwidth from one of the data sources delivering digital data to the peers. This method comprises the following steps:

a first step of determining the amount of bandwidth available for the delivery of the digital data from the selected one of the plurality of data sources;

a second step of monitoring a rate of receipt of the delivery data at one or more of the one or more peers from the plurality of data sources;

a third step of adjusting the rate of delivery of the digital data from other ones of the plurality of data sources such that the use of the bandwidth from the selected one of the plurality of data sources is maximised.

DESCRIPTION OF THE DRAWINGS

FIG. 8 shows an overview of a data delivery controller and monitor.

DETAILED DESCRIPTION OF THE INVENTION

Figure 1:
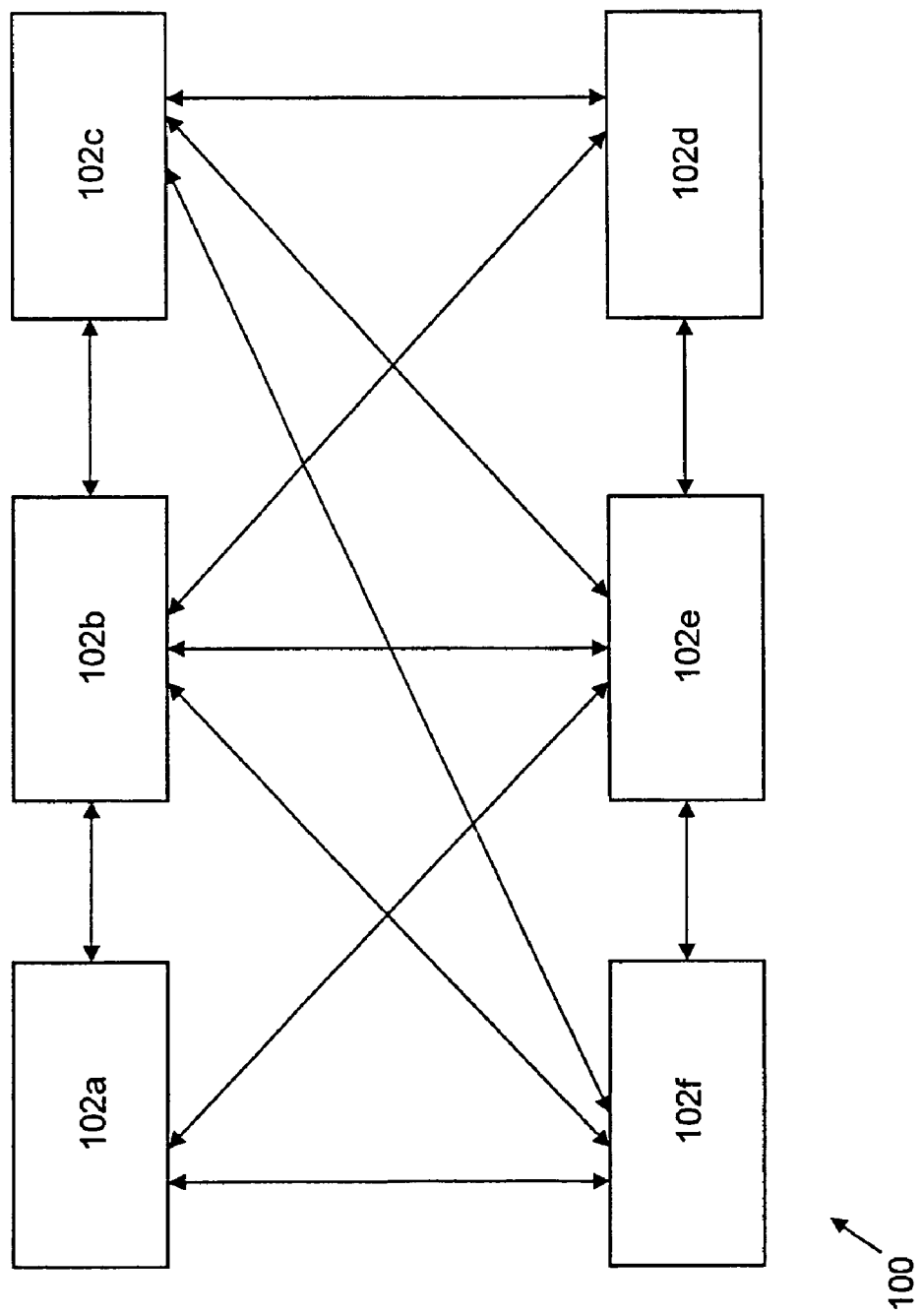
FIG. 1 shows a Peer-to Peer network as known in the art.

FIG. 1 is a block diagram illustrating an environment in which the invention may be practiced. FIG. 1 includes a Peer-to-Peer (P2P) network 100. The P2P network 100 includes a plurality of peers, such as peer 102a, 102b, 102c, 102d, 102e and 102f, hereinafter referred to as peers 102, connected to each other. P2P network 100 may be a Local Area Network (LAN), a Wide Area Network (WAN), a Metropolitan Area Network (MAN), a wireless network and the like. The peers 102 present in the P2P network 100 include stored digital data. Various examples of the digital data include, but are not limited to, an application file, a video file, a music file and the like. In P2P network 100 the digital data is shared among the peers 102. It should be understood that the peers 102 may store multiple copies of the digital data.

Figure 2:
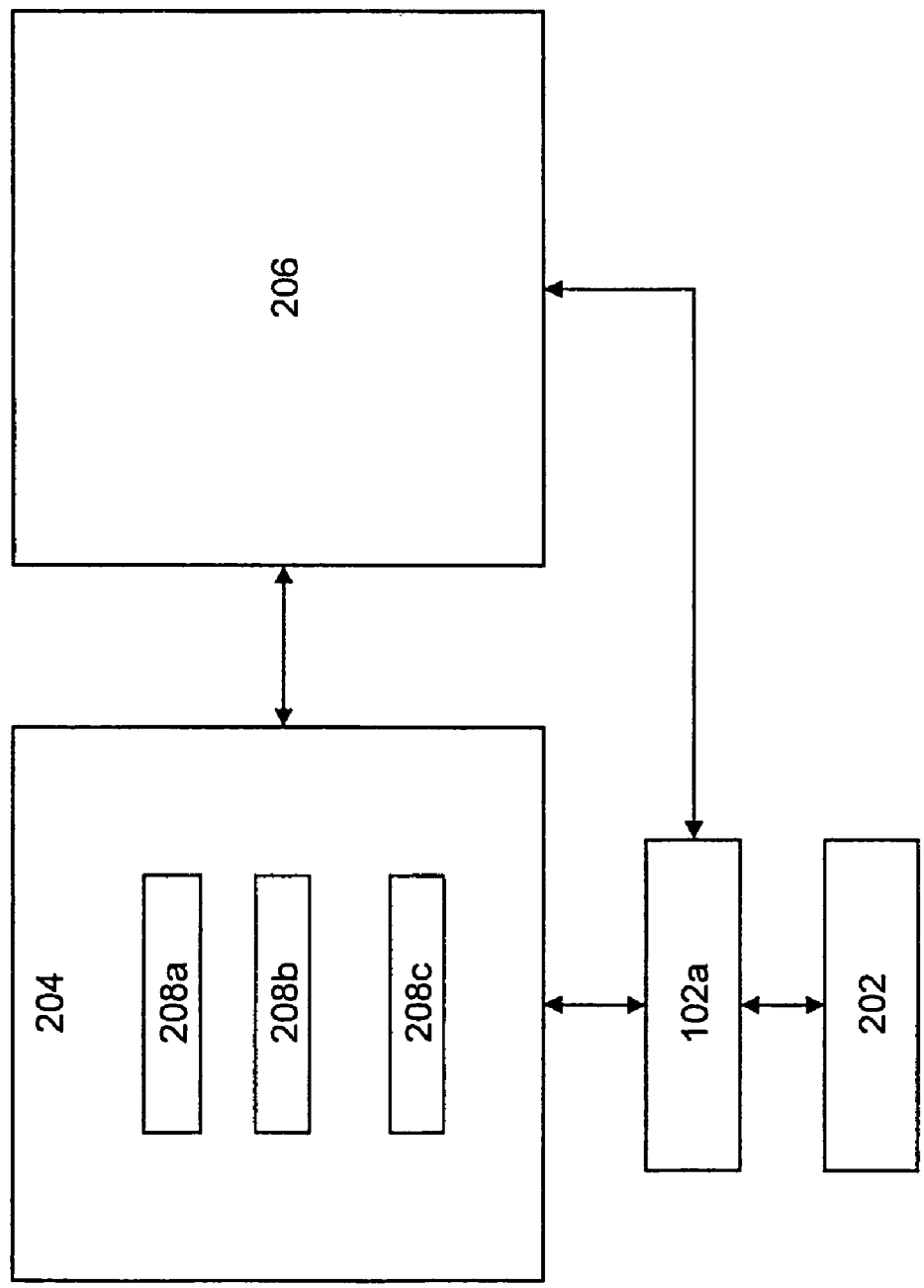
FIG. 2 shows the request for a download of a digital object.

FIG. 2 is a block diagram illustrating a user 202 sending a request for download of a digital object through peer 102a, in accordance with an example of the invention. FIG. 2 includes the peer 102a, the user 202, a server 204 and a tracker server 206. The server 204 can include one or more torrent files, such as torrent file 208a, 208b and 208c, hereinafter referred to as the torrent files 208. The present invention has been described with respect to BitTorrent protocol as an exemplary example. It should be understood by those skilled in the art that present invention is applicable to all P2P protocols.

The user 202 makes a request at the peer 102a to download the digital object. The peer 102a communicates with the server 204 and provides information for the digital object to be downloaded to the server 204. Subsequently, the server 204 locates one of the torrent files related to the digital object requested for download by peer 102a, such as, for example, torrent file 208a. The torrent files 208 may include information related to the name, size, number of pieces and check sum error for the digital object to be downloaded by peer 102a.

The tracker server 206 can provide a list of peers 102 present in the P2P network 100 with the pieces of the digital object to be downloaded. The peer 102a, thereafter, communicates with the available list of peers 102 for downloading the related digital objects. The peer 102a communicates with peers 102 by sending a bitfield of the pieces of the digital object that peer 102a has. After peer 102a receives all the bitfields from peers 102, it sends a message to the peers 102 where it finds relevant data and starts downloading the pieces of the requested digital object.

Figure 3:
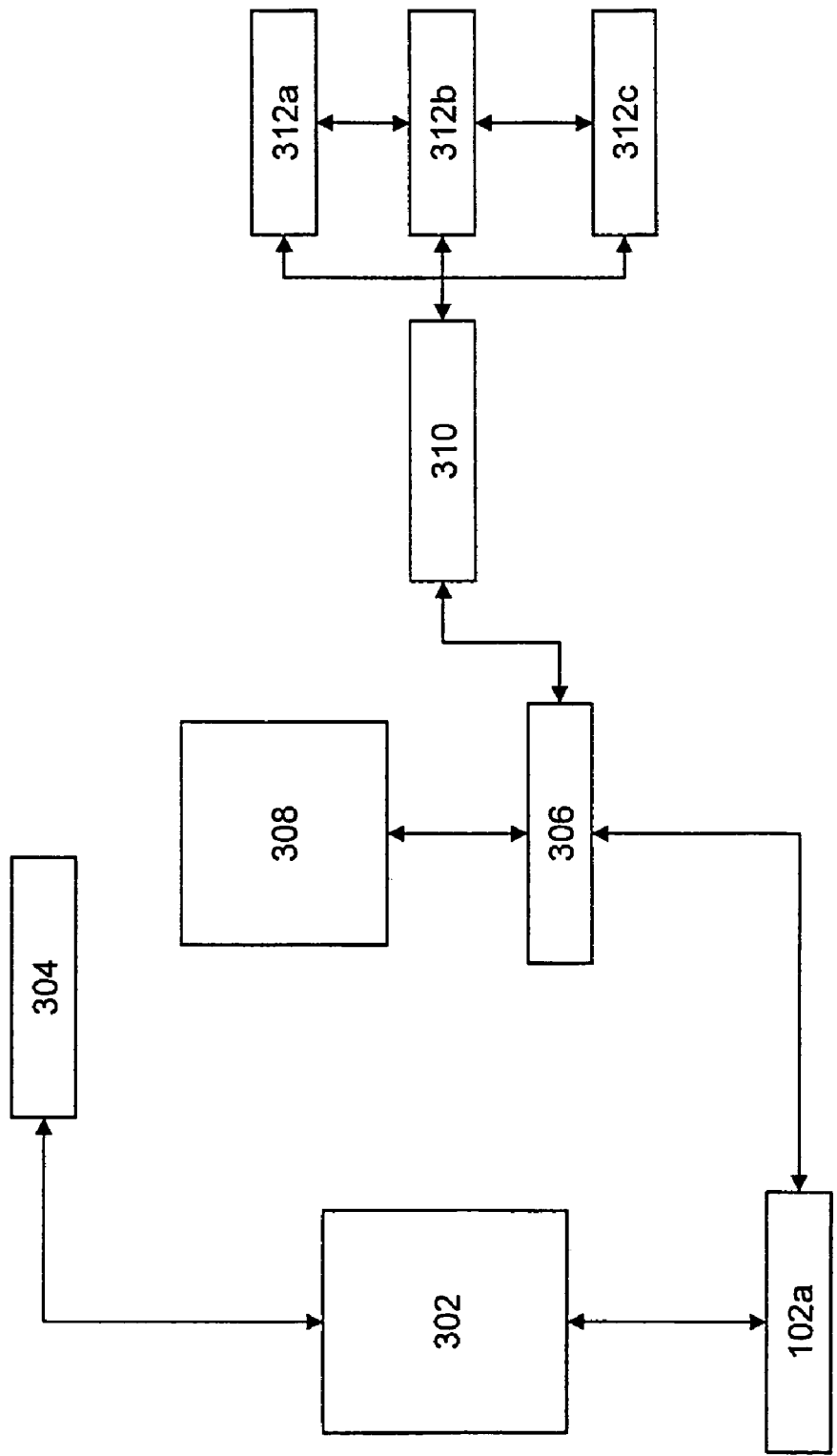
FIG. 3 shows an overview of the network in accordance with the invention.

FIG. 3 is a block diagram illustrating peer 102a in communication with a Cache Location Server (CLS) 302. FIG. 3 includes the peer 102a, the CLS 302, a database 304, an Internet Service Provider Domain Name Server (ISP DNS) 306, a central Domain Name Server (central DNS) 308, a cache DNS 310 and one or more caches, such as, cache 312a, 312b and 312c, hereinafter referred to as caches 312.

The peer 102a communicates with the CLS 302. The information sent by the peer 102a to the CLS 302 may also contain the IP address of the peer 102a. Based on the received information, the CLS 302 communicates a location string to the peer 102a. The CLS 302 may get the location string from the database 304. The database 304 stores information about the IP address ranges of countries, ISPs, regions, towns, etc for the purpose of generating specific location strings with respect to peers 102.

The peer 102a then, using the location string and information from the Torrent File 208, makes communication with the ISP DNS 306.

As an example only, the information sent by peer 102a to ISP DNS 306 may be as following:

Protocol-TruncatedHash.Protocol-Publisher-LocationString.Find-Cache.com

An example of the information sent by CLS 302 to peer 102a may be as following:

bt-1234.bt-bigcorp-bigispnyc.find-cache.com where, 'bt' represents the BitTorrent protocol used by the peer 102a, '1234' representing a specific hash value associated with the digital object to be downloaded by the peer 102a, 'bigcorp' representing the publisher (a fictional "Big Corporation") of the digital object to be downloaded, 'bigispnyc' representing the location string for the peer 102a (the New York point of presence for a fictional "Big ISP").

Based on this communication, the ISP DNS 306 redirects the request to the central DNS 308 (which is the name server for the domain contained in the communication). Thereafter, the central DNS 308 provides an address of the cache DNS 310 to the ISP DNS 306. The cache DNS 310, thus, receives a DNS request from the ISP DNS 306 for the digital object to be downloaded. Subsequently, the cache DNS 310 allocates one of the caches 312, such as, for example, cache 312a. The cache DNS 310 may allocate one of the caches 312 based on the load, availability and content on each of them. The cache DNS 310 communicates this information to the ISP DNS 306, which in turn communicates the information to the peer 102a.

The peer 102a, thereafter, makes a communication with the cache 312a for downloading the digital object. The communication between the peer 102a and cache 312a is explained in detail in FIG. 4.

Figure 4:
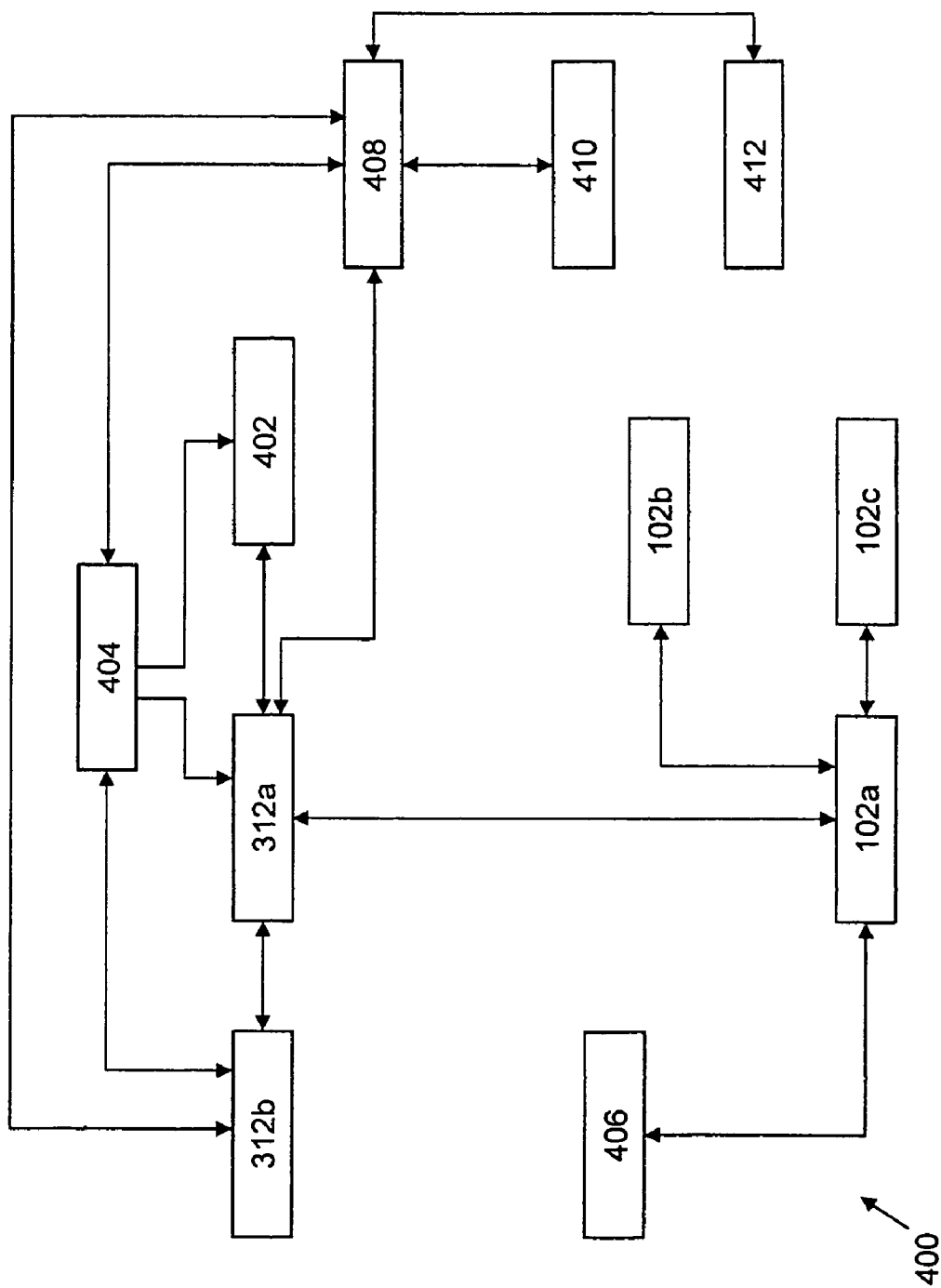
FIG. 4 shows an overview for the distribution of content.

FIG. 4 is a block diagram illustrating a system 400 for content distribution in the P2P network 100. The system 400 includes the peer 102a, 102b and 102c, the cache 312a and 312b, a content server 402, a private tracker 404, a public tracker 406, a business logic unit 408, a central database server 410 and a user interface unit 412.

The peer 102a sends a request to the cache 312a for downloading the digital object. The cache 312a is connected to the content server 402 and the private tracker 404. The content server 402 may include complete copies of a plurality of stored digital objects in the P2P network 100. In an example of the present invention, the content server 402 is connected to a publisher's computer network. The content server 402 receives the digital objects, which are to be distributed, from the publisher's computer network. For example, the publisher wishing to distribute a video file in the P2P network 100 would first upload the video file to the content server 402. Thereafter, the video file can be subsequently downloaded by the peers 102 from the content server 402.

As soon as the publisher uploads a piece of the digital object on the content server 402, the digital data can become available for the peers 102 to be downloaded. Thus, as the publisher progresses with the upload of subsequent pieces of the digital object, the peers 102 are able to download those uploaded pieces in parallel. Therefore, the capability of the system 400 to execute parallel uploads and downloads of the digital object from the content server 402 ensures an efficient real time availability of digital objects in the P2P network 100.

The cache 312a downloads the digital objects, based on the request from the peer 102a, from the content server 402 or from cache 312b. The private tracker 404 knows which of the digital objects are available on which of the caches 312 and content servers 402 and provides this information to the cache 312a. If the digital object requested by the peer 102a is available on the cache 312a, the peer 102a downloads the digital object from the cache 312a. If the digital object is not available on the cache 312a, the cache 312a downloads the requested digital object from the content server 402 and/or the cache 312b. Thereafter, the cache 312a makes the digital object available to the peer 102a for downloading. The peer 102a may also download the related digital objects from the other peers 102 available in the P2P network 100, such as, for example, peer 102b and peer 102c.

The cache 312a may also upload digital objects from the peers 102 available in the P2P network 100. In such a case, the cache 312a acts as one of the peers 102.

As discussed above, the private tracker 404 maintains a track of all the data available on the content server 402 and the caches 312. The public tracker 406 is connected to all of the caches 312 and to all of the peers 102 in the P2P network 100. The public tracker 406 maintains a track of all the data digital objects transferred among the caches 312 and the peers 102. In particular, the public tracker 406 maintains a list of all of the peers 102 and the caches 312 which hold copies of the digital objects available in the P2P network 100.

The business logic unit 408 is connected to all the caches 312 and the private tracker 404. The business logic unit 408 authenticates peers 102 before allowing the peers 102 to upload any digital object. Further, the business logic unit 408 is connected to the central database server 410. The business logic unit 408 acts as an interface between the P2P network 100 and the central database server 410. Central database server 410 acquires log reports from the private tracker 404 and caches 312, through the business logic unit 408, for all the data transferred to and from the caches 312 and the content server 402. Using the information from the central database server 410 obtained via the business loging unit 408, such as, the log reports, the user interface unit 412 provides the required information billing purposes and for report generation.

The central database server 410 may be connected to the public tracker 406. The public tracker 406 may be connected to the private tracker 404.

Figure 5:
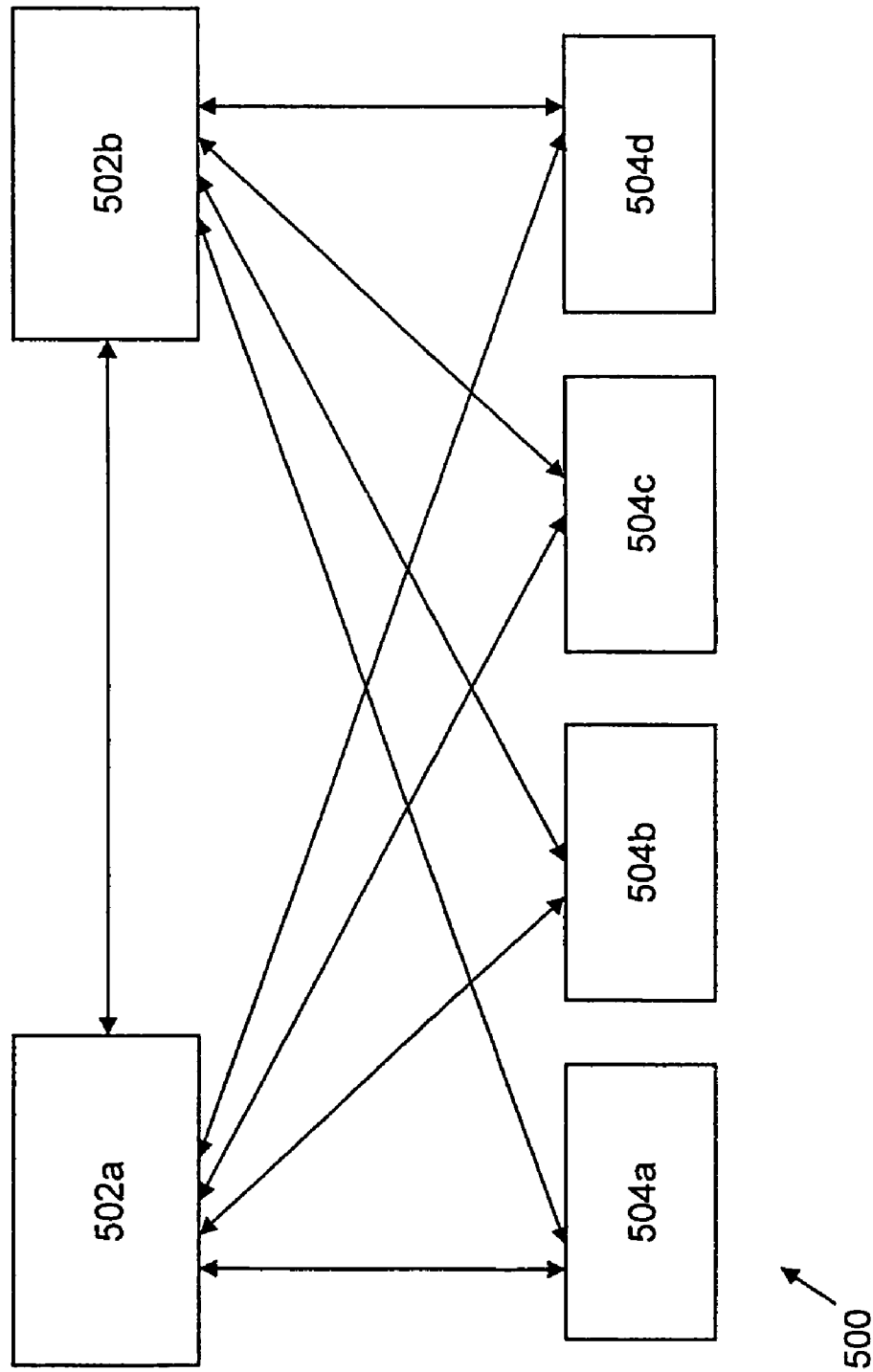
FIG. 5 shows a geographical implementation of a content distribution network

FIG. 5 is a block diagram illustrating an exemplary geographical implementation of a cache distribution network 500. The cache distribution network 500 includes one or more service points of presence, such as, a service point of presence 502a and 502b, hereinafter referred to as the service points of presence (POPs) 502. The cache distribution network 500 further includes one or more data points of presence, such as, data point of presence 504a, 504b, 504c and 504d, hereinafter referred to as data points of presence (POPs) 504. The service POPs 502 are located at remote geographical locations for, such as, for example London, San Jose and so forth. It should be understood by those skilled in art that the number of the service POPs 502 locations are scalable and may be increased with the increase in network traffic. The service POPs 502, such as the service POP 502a and 502b, are connected to each other. The connection between the service POPs 502 enables a real time data and information transfer between all of the service POPs 502, Furthermore, the data POPs 504 are also located in remote geographical locations across the globe, such as, for example, New York, Frankfurt and so forth. It should be understood by those skilled in art that the number of the data POPs 504 locations are scalable and may be increased with the increase in network traffic and digital objects available in the P2P network 100. The data POPs 504, such as the data POP 504a and 504b, are connected with all the available service POPs 502 in the P2P network 100. The connection between the data POPs 504 and service POPs 502 enables a real time data update and information transfer between the data POPs 504 from the service POPs 502, The geographical location may include both, the service POP 502a and the data POP 504a.

Figure 6:
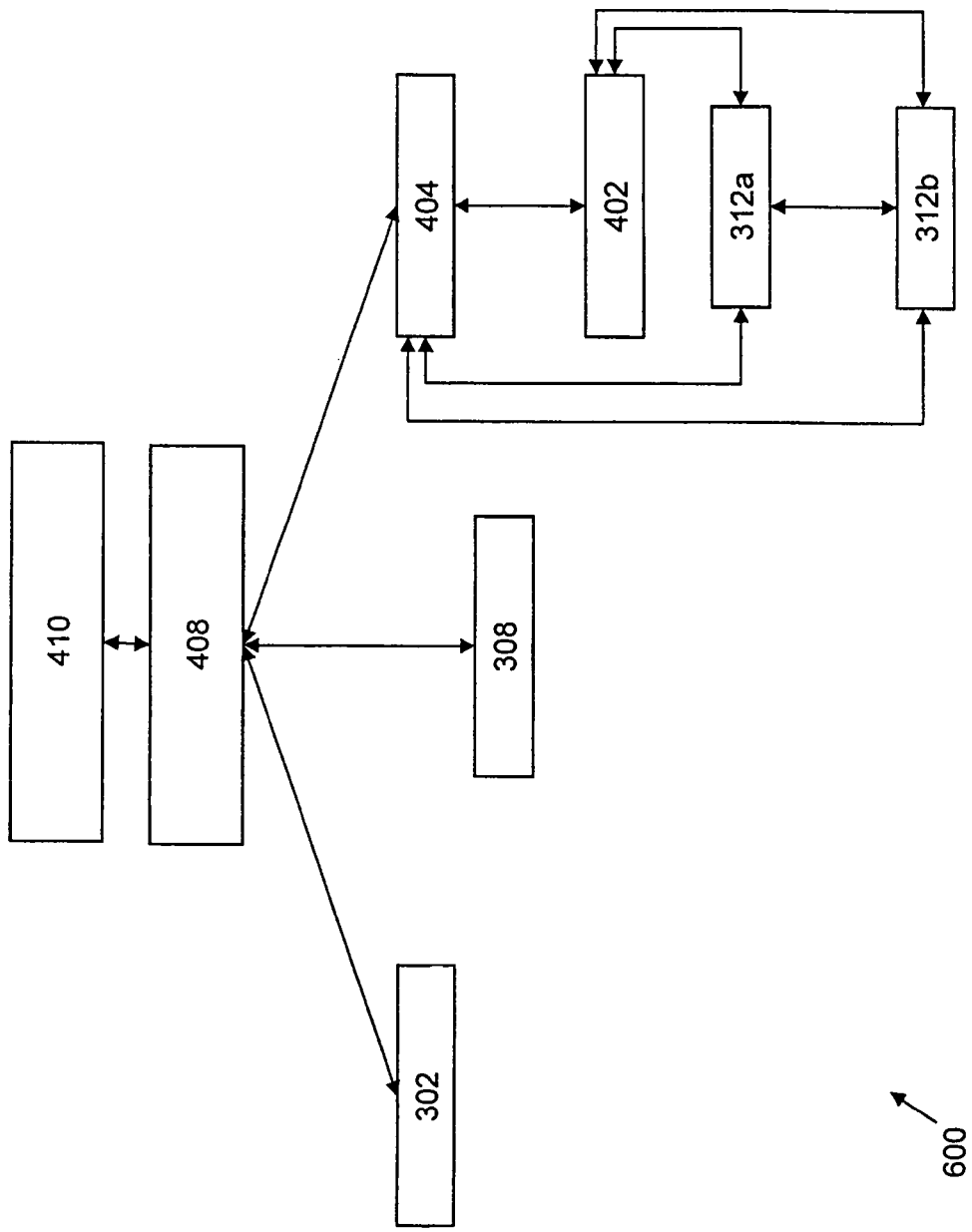
FIG. 6 shows an overview of a service point of presence.

FIG. 6 is a block diagram illustrating an arrangement 600 of the components of the service POP 502a, in accordance with an example of the present invention. The arrangement 600 for the service POP 502a includes the cache location server 302, the central domain name server 308, the content server 402, the private tracker 404 and the central database server 410. The arrangement 600 for the service POP 502a may include the caches 312, such as, the cache 312a and 312b. Furthermore, in an example of the present invention, the arrangement 600 for the service POP 502a includes the public tracker 406, the business logic unit 408 and the user interface unit 412.

The central database server 410 may be located in each of the service POPs 502. The central database server 410 of each of the service POPs 502 are connected to each other and act as a central database unit.

It should be understood by those skilled in the art that the components illustrated in the arrangement 600 for the service POP 502a are scalable and may be increased based on the network traffic and the digital objects available in the P2P network 100.

Figure 7:
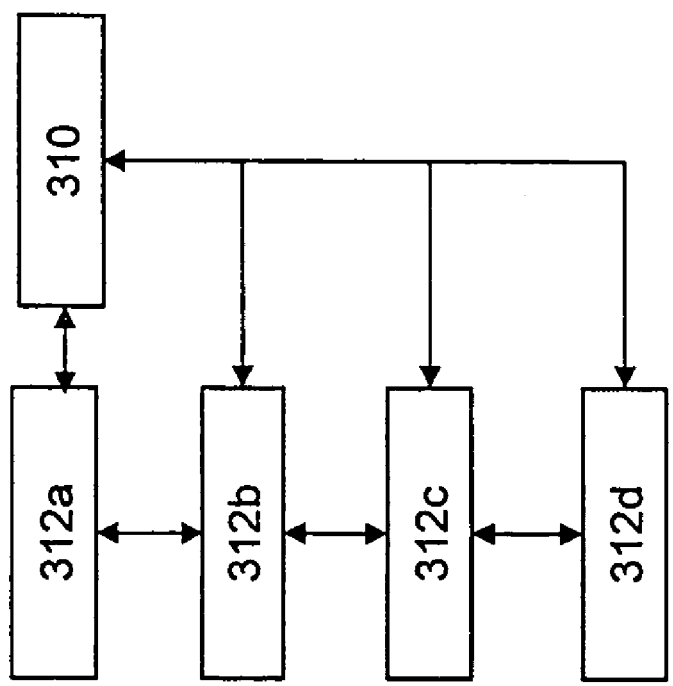
FIG. 7 shows an overview of a data point of presence.

FIG. 7 is a block diagram illustrating an arrangement 700 of the components of the data POP 504a. The arrangement 700 for the data POP 504a includes the caches 312, such as, the cache 312a, 312b, 312c and 312d and the cache DNS 310. Only a single cache DNS 310 is shown in FIG. 7 for simplicity. However, the data POP 504a may contain more than one of the single caches DNS 310. The data POP 504a provides digital objects for the peers 102 in the P2P network 100. The data POPs 504 download data from the service POPs 502.

It should be understood by those skilled in the art that the components illustrated in the arrangement 700 for the data POP 504a are scalable and may be increased based on the network traffic and the digital objects available in the P2P network 100.

As discussed above in connection with FIG. 4, the peer 102a downloads from the cache 312a and from the other peers 102 available in the P2P network 100. The rates of delivery of digital data representing the pieces of the digital objects vary from the multiple sources, as does the quality and the cost in providing the digital data. For example, the digital data from the peers 312 is not (necessarily) of high quality and the rate of delivery of the digital data can be—but is not necessarily—slow. On the other hand, the rates of delivery of the digital data from caches 312 can be fairly high—particularly if the connection from the caches 312 to the peer 102a has a high bandwidth. The quality of the digital data is also high, for example the digital data does not contain many errors. However the cost of delivering the digital data from the caches 312 is higher than the cost of delivering the digital data from the peers 102.

There is a further issue with the caches 312. The cost of the connection from the peer 102a to the caches 312 is normally related to the maximum throughput provided by the caches 312. As a result, for example, during the day the caches 312 may be extremely busy but at night the caches 312 may not be so busy. The caches 312 (and the connection from the peer 102a to the caches 312) will have capacity available to the caches 312 during the night which has been paid for. The incremental cost in delivering the digital data from the caches 312 during the night is accordingly much smaller than the incremental cost in delivering the digital data from the server 312 during the day.

The rate of delivery of the digital data to the peer 102a is therefore a combination of the rates of delivery of the digital data from the other peers 102 and the caches 312. The cost for the delivery of the digital data varies according to which ones of the multiple sources (i.e. peers 102 and/or caches 312) supplies the digital data. If the digital data is supplied principally from the other peers 102 to which the peer 102a is connected, the cost of the digital data will be small. In particular, if the other peers 102 are severed by the same ISP the cost will be very small. However, the quality of service may not be acceptable.

An unacceptable quality of service is when the peer 102a does not receive the digital data at sufficient speed or the received digital data contains too many errors. One example of an unacceptable quality of service may occur when a user 202 at the peer 102a wishes to watch a video. The video is stored as a digital object in the form of video data. A certain amount of digital data has to reach the peer 102 within a fixed period of time in order for the peer 102a to watch the video. If the digital data representing the pieces of the digital object is not received at the peer 102a, then the user 202 will experience an interruption in the transmission of the video.

The pieces of the digital object may be downloaded from the caches 312. However, the downloading of the digital data from the caches 312 is more costly as the bandwidth is wider, the digital data may have to pass over leased lines and the rate of the delivery of the digital data is much higher. The peer 102a can get more than enough digital data from the caches 312 to enable the user 202 to view the video and the quality of data will be much higher.

In essence a combination of the delivery of digital data from the other peers 102 and from the caches 312 offers the best option.

In order to perform this combination of the delivery of data, the peer 102a is provided with a data delivery monitor 800 as shown in FIG. 8. FIG. 8 illustrates not only the data delivery monitor 800 but also two of the other peers 102b and 102c supplying the peer 102a with digital data and the caches 312 supplying the peer 102a with digital data. It will be understood that in practice the peer 102a will be connected to multiple other peers 102 and possibly to more than one caches 312. A data delivery controller 810 is also illustrated connected to the caches 312.

The data delivery monitor 800 is provided with predetermined quality of service (QoS) parameters. Different ones of the digital objects will have different predetermined quality of service parameters. The data delivery monitor 800 monitors the rate of receipt of the digital data at the peer 102a and may monitor the rate of receipt of the digital data from the other peers 102b and 102c as well as from the caches 312, such as cache 312a. The monitored real-time quality of service parameters are compared with predetermined quality of service parameters. The predetermined quality of service parameters can be pre-programmed into the data delivery monitor 800 and/or may be dynamically adjusted. The rate of delivery of the digital data to the peer 102a may be adjusted on the basis of the comparison as will be discussed below. The data delivery monitor 800 sends QoS information to a data delivery controller 810.

The quality of service parameters include, but are not limited to, the rate of receipt of the delivery of the digital data to the peer 102a, the cost of the delivery of the digital data and the error rate of the received digital data. For example, the pre-determined quality of service parameters could include the requirement that the data is received at a rate between 1 Mb and 1.2 Mb per second to allow the viewing of the video by the user 202 at the peer 102a. The pre-determined quality of service parameters might also require that the total cost for the delivery of the digital data not exceed, for example, 30c.

The data delivery monitor 800 and the data delivery controller 810 may be positioned in an appropriate place within the P2P network 100. In the embodiment shown in FIG. 8, the data delivery monitor 800 and the data delivery controller 810 is positioned at the cache 312a. The data delivery monitor 800 may be positioned at the public tracker 406 but the data delivery controller 810 will be positioned at some or all of the caches 312 and some or all of the peers 102. The data delivery monitor 800 and the data delivery controller 810 may also be positioned at the peers 102 or elsewhere in the P2P network 100. More than one data delivery monitor 800 and more than one data delivery controller 810 may be employed in the P2P network 100.

The function of the data delivery controller 810 is to receive the QoS information from the data delivery monitor 800 and to adjust the rate of delivery of the digital data from the other peers 102 and the caches 312. The adjustment may be done, for example, by turning off or on some of the connection through which the digital data is delivered to the peer 102a. The peer 102a will therefore receive less data. The adjustment may also be done by changing the bandwidth of the connection between the peer 102a and the other peers 102 or, more commonly, the caches 312. Changing the bandwidth is, for example, particularly appropriate when the source of the digital data is the caches 312 and turning on or off the channel is particularly appropriate when the source of the digital data is one of the other peers 102.

The data delivery controller 810 may make further decisions. It may choose, for example, to throttle the rate of delivery of the digital data from other peers 102 or from other ones of the caches 312 situated outside of the internet service provider (ISP) at which the peer 102a is situated. The ISP may wish to preferentially use the other peers 102 and any caches 312 within its domain and thus restrict traffic to any ones of the other peers 102 or any caches 312 outside of its domain.

The data delivery monitor 800 can monitor the receipt of the digital data by monitoring content availability messages, such as BitField and Have messages in the BitTorrent protocol. Equivalent techniques and messages exist in other P2P protocols.

The data delivery controller 810 may also select to preferentially source the digital data from underused caches 312 as discussed above. To take an example using FIG. 5, the nearest caches 312 of the digital data for the peer 102a in Germany is, for example, located in Frankfurt. It would be from a location viewpoint optimal to use the caches 312 in Frankfurt for the delivery of the digital data. On the other hand, if the peer 102a is accessing the digital data in the morning, it is probable that the caches 312 in San José is underutilised because of the different time zones whilst the caches 312 in Frankfurt is operating at or close to its maximum throughput. There may be bandwidth available from the San José caches 312 available at minimal incremental cost. As a result, the data delivery controller 810 will attempt to deliver the digital data preferentially from the San José caches 312 in order to minimise costs.

The foregoing description is that of the preferred embodiments of the invention and that various changes and modifications may be made thereto without departing from the spirit and scope of the invention.

The invention claimed is:

1. A peer-to-peer network for the delivery of digital data comprising:
    at least one cache included in a plurality of data sources, said plurality of data sources including one or more peers, available for at least one peer to download the digital data from said plurality of data sources;
    at least one data monitoring device located at said at least one cache for monitoring at least one quality of service parameter for the delivery of the digital data to said at least one peer, said at least one quality of service parameter comprising the rate of data delivery received by the said at least one peer; and
    at least one data delivery controller for adjusting at least one of the rates for the delivery of the digital data from said at least one cache depending on the monitored quality of service parameter;
    wherein said at least one cache is external to said one or more peers such that said at least one cache and said one or more peers are distinct data sources within said plurality of data sources; and
    wherein said at least one peer downloads at least a first portion of the digital data from said at least one cache and at least a second portion of the digital data from said one or more peers.

2. The network of claim 1, wherein the plurality of data sources comprise multiple types of data sources.

3. The network of claim 1, wherein said at least one quality of service parameter comprises a cost of the data delivery.

4. The network of claim 3, wherein a first cost of the data delivery associated with the first portion of the digital data downloaded from said at least one cache differs from a second cost of data delivery associated with the second portion of the digital data downloaded from said one or more peers.

5. The network of claim 1, wherein the data delivery controller is located at said at least one cache.

6. The network of claim 1, wherein the data delivery monitor monitors content availability messages from the peer.

7. The network of claim 1 further comprising a plurality of caches, whereby each one of the caches has at least one data delivery monitor and at least one data delivery controller.

8. A method for delivery of digital data to a peer from a plurality of data sources in a peer-to-peer network comprising the following steps:
    making available access to at least one cache included in the plurality of data sources, said plurality of data sources including one or more peers, for downloading data therefrom by the peer;
    using at least one data monitoring device to monitor at the at least one cache at least one quality of service parameter for receipt of the digital data at the peer from the plurality of data sources, said at least one quality of service parameter comprising the rate of data delivery received by the peer; comparing the at least one quality of service parameter for the receipt of the digital data with at least one predetermined quality of service parameter; using at least one data delivery controller to adjust the receipt of the digital data at the peer from the at least one cache in accordance with a result of the comparison step;
    wherein said at least one cache is external to said one or more peers such that said at least one cache and said one or more peers are distinct data sources within said plurality of data sources; and
    wherein said at least one peer downloads at least a first portion of the digital data from said at least one cache and at least a second portion of the digital data from said one or more peers.

9. The method of claim 8, wherein the predetermined quality of service parameter comprises the cost of the delivery of the digital data to the peer.

10. The method of claim 9, wherein a first cost of the data delivery associated with the first portion of the digital data downloaded from said at least one cache differs from a second cost of data delivery associated with the second portion of the digital data downloaded from said one or more peers.

11. The method of claim 8, wherein the rate of the receipt of the digital data lies between specified parameters.

12. The method of claim 8, wherein adjusting the receipt comprises adjusting the bandwidth for the delivery of the digital data from the at least one cache.

13. A non-transitory digital data storage medium encoding a machine-executable program of instructions to perform a method for delivery of digital data to a peer from a plurality of data sources in a peer-to-peer network, the method comprising the steps of:
    making available access to at least one cache included in the plurality of data sources, said plurality of data sources including one or more peers, for downloading data therefrom by the peer;
    using at least one data monitoring device to monitor at the at least one cache at least one quality of service parameter for receipt of the digital data at the peer from the plurality of data sources, said at least one quality of service parameter comprising the rate of data delivery received by the peer;

comparing the at least one quality of service parameter for the receipt of the digital data with at least one predetermined quality of service parameter;

using at least one data delivery controller to adjust the receipt of the digital data at the peer from the at least one cache in accordance with a result of the comparison step;

wherein said at least one cache is external to said one or more peers such that said at least one cache and said one or more peers are distinct data sources within said plurality of data sources; and wherein said at least one peer downloads at least a first portion of the digital data from said at least one cache and at least a second portion of the digital data from said one or more peers.

14. The non-transitory data storage medium of claim 13, wherein a first cost of data delivery associated with the first portion of the digital data downloaded from said at least one cache differs from a second cost of data delivery associated with the second portion of the digital data downloaded from said one or more peers.

* * * * *